(12) United States Patent
Hagano

(10) Patent No.: US 8,096,332 B2
(45) Date of Patent: Jan. 17, 2012

(54) FILLER NECK

(75) Inventor: Hiroyuki Hagano, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 646 days.

(21) Appl. No.: 12/232,911

(22) Filed: Sep. 25, 2008

(65) Prior Publication Data

US 2009/0084464 A1   Apr. 2, 2009

(30) Foreign Application Priority Data

Sep. 28, 2007   (JP) ................... 2007-253150

(51) Int. Cl.
*B65B 1/04* (2006.01)
*B65B 3/00* (2006.01)

(52) U.S. Cl. .................. 141/285; 141/350; 220/86.2

(58) Field of Classification Search .......... 141/365, 141/54, 285, 350; 220/86.2
See application file for complete search history.

(56) References Cited

U.S. PATENT DOCUMENTS

| | | | | |
|---|---|---|---|---|
| 3,942,564 A | * | 3/1976 | Nakazato | ............ 141/348 |
| 4,300,699 A | | 11/1981 | Anhegger | |
| 4,722,454 A | * | 2/1988 | Fischer | ............ 220/746 |
| 5,040,575 A | * | 8/1991 | Oeffling et al. | ............ 141/44 |
| 6,523,582 B2 | | 2/2003 | Furuta | |
| 7,198,078 B2 | * | 4/2007 | Miura et al. | ............ 141/286 |
| 2004/0069782 A1 | * | 4/2004 | Miura et al. | ............ 220/86.2 |
| 2007/0108211 A1 | * | 5/2007 | Zhu | ............ 220/367.1 |
| 2007/0169845 A1 | * | 7/2007 | Benjey et al. | ............ 141/350 |

FOREIGN PATENT DOCUMENTS

| | | |
|---|---|---|
| JP | U-64-32456 | 3/1989 |
| JP | U-03-032521 | 3/1991 |
| JP | A-08-2265 | 1/1996 |
| JP | A-09-105364 | 4/1997 |
| JP | A-2004-9789 | 1/2004 |

* cited by examiner

*Primary Examiner* — Dinh Nguyen
*Assistant Examiner* — Jennifer Gordon
(74) *Attorney, Agent, or Firm* — Posz Law Group, PLC

(57) ABSTRACT

The filler neck includes a neck tube body having a fuel passage a guide member for guiding the fuel gun and a recirculation passage that connects the fuel tank and the neck tube body through a passage separate from the fuel passage, and that directs fuel vapors inside the fuel tank into the fuel passage. The neck tube body includes a housing chamber a primary connector section and a secondary connector section connected to the housing chamber and defining part of the recirculation passage. The guide member is a member that is housed in the housing chamber and includes a guide section for guiding the fuel gun into the fuel passage and a passage-defining section formed in the guide section, and partly defining the recirculation passage inside the housing chamber.

4 Claims, 7 Drawing Sheets

FILLER NECK

This application claims the benefit of and priority from Japanese Application No. 2007-253150 filed Sep. 28, 2007, the content of which is incorporated herein by reference.

BACKGROUND OF THE INVENTION

1. Field of the Invention

The present invention relates to a filler neck for directing fuel into a fuel tank.

2. Description of the Related Art

The technology disclosed in JP-A-2002-283855 is one known example of a conventional fueling device equipped with the sort of filler neck. Specifically, the fueling device includes a filler tube, and a guide section inserted partway into the filler tube and used to guide the fuel gun. The guide section includes a mechanism that retains the cap; by being fastened to a flange in the neck, it is attached so as to be inserted partway into the filler tube. A return tube is provided in the outside peripheral portion of the filler tube. The return tube connects the fuel tank to a fuel passage inside the fuel tube, thereby constituting a recirculation passage which functions to prevent air containing fuel vapors from escaping to the outside during fueling.

However, in the conventional fuel device, a vent jacket section is disposed between the filler tube and the guide section, with the vent jacket section defining part of the recirculation passage. In order to prevent fuel vapors from leaking out between the filler tube and the guide section, it was necessary for the vent jacket section to be made highly gastight, which required a complicated construction.

SUMMARY

An advantage of some aspects of the invention is provided with a filler neck capable of maintaining high sealing ability with a simple design.

According to an aspect of the present invention, there is provided a filler neck for guiding fuel dispensed from a fuel gun into a fuel tank. The filler neck comprising: a neck tube body having a fuel passage; a guide member retained within the neck tube body for guiding the fuel gun; and a recirculation passage that connects the fuel tank with the neck tube body, the recirculation passage being configured to be separated from the fuel passage and directs fuel vapors inside the fuel tank into the fuel passage. The neck tube body includes a housing chamber sealed off from the outside by a fuel cap; a primary connector section defining the fuel passage; and a secondary connector section connected to the housing chamber and defining part of the recirculation passage. The guide member is a member housed in the housing chamber and includes: a guide section for guiding the fuel gun into the fuel passage; and a passage-defining section formed with the guide section and partly defining the recirculation passage inside the housing chamber.

The invention in a first mode provides a filler neck for guiding fuel dispensed from a fuel gun into a fuel tank, comprising: a neck tube body having a fuel passage; a guide member retained within the neck tube body, for guiding the fuel gun; and a recirculation passage that connects the fuel tank with the neck tube body through a passage that is separate from the fuel passage, and that directs fuel vapors inside the fuel tank into the fuel passage; wherein the neck tube body includes a housing chamber sealed off from the outside by a fuel cap; a primary connector section defining the fuel passage; and a secondary connector section connected to the housing chamber and defining part of the recirculation passage; and the guide member is a member housed in the housing chamber and includes: a guide section for guiding the fuel gun into the fuel passage; and a passage-defining section formed in the guide section and partly defining the recirculation passage inside the housing chamber.

In the first mode, fueling is carried out by removing the fuel cap from the opening of the filler neck and inserting the fuel gun through the opening. The fuel gun, guided by the guide member, slides into the fuel passage. Then, when fuel is dispensed from the fuel gun, the fuel will flow into the inlet tube so that fuel is supplied to the fuel tank. The flow velocity of the fuel flowing through the fuel passage at this time gives rise to negative pressure in proximity to the outlet of the outlet passage. This negative pressure facilitates outflow of air containing fuel vapors of the fuel tank from the outlet via the recirculation passage, i.e. via the passage in the secondary connector section, the vent passage, the communicating chamber, and the outlet passage. Thus, air containing fuel vapors from the fuel tank can be expelled through the recirculation passage, so that fueling can take place smoothly. During fueling, the air containing fuel vapors from the fuel tank that has flowed out through the recirculation passage will now flow through the fuel passage and the inlet tube together with the flow of fuel during fueling, so that the vapors will not be released to the outside through the opening.

The housing chamber of the neck tube body is sealed off from the outside by the fuel cap. Since the guide member is housed inside this housing chamber, provision of the guide member does not require means for sealing the space between the guide member and the neck tube body from the outside as in the prior art described above, thus affording a simpler construction.

Furthermore, since the passage-defining section that defines the recirculation passage is produced simply by inserting the guide member into the housing chamber, and since the connecting location thereof is situated within the housing chamber, stringent sealing ability will not be needed, and the construction can be simpler.

The invention in a second mode provides a filler neck designed with a catch claw disposed on the inside wall of the neck tube body, and the guide member is secured within the housing chamber through partial engagement of the guide member with the catch claw. With this design, once the guide member has been inserted through the opening of the neck tube body, the lower part of the guide member will be supported on the base part of the neck tube body, while the upper end of the upper guide part of the guide member will be retained on the neck tube body through engagement with the catch claw of the neck tube body, and secured to the neck tube body thereby.

The invention in a third mode provides a filler neck wherein the primary connector section includes a passage-defining wall that defines an outlet passage which constitutes part of the recirculation passage; and the outlet passage connects to a passage defined by the passage-defining section. Since the outlet passage is provided to the fuel passage, which gives rise to negative pressure by the flow of supplied fuel, the air containing fuel vapors can be recirculated efficiently.

These and other objects, features, aspects, and advantages of the present invention will become more apparent from the following detailed description of the preferred embodiments with the accompanying drawings.

BRIEF DESCRIPTION OF THE DRAWINGS

DESCRIPTION OF THE PREFERRED EMBODIMENTS (1) General Construction of Fueling Device FIG. 1 is a general schematic diagram depicting a fueling device that employs a filler neck 10 according to one embodiment of the present invention. As depicted in FIG. 1, the filler neck 10 delivers fuel to a fuel tank FT, the fuel being supplied by a fuel gun (not shown). The filler neck 10 is disposed between an inlet box IB and the fuel tank FT. The inlet of the filler neck 10 is opened and closed by a fuel cap FC, and the downstream end of the filler neck 10 connects to an inlet tube IT and a recirculation tube RT. The inlet tube IT delivers the fuel dispensed by the fuel gun from the filler neck 10 to the fuel tank FT. The recirculation tube RT defines part of a recirculation passage permitting air that contains fuel vapors from the fuel tank FT supplied with the fuel, to escape from the fuel tank FT. Owing to this construction of the fueling device, when during fueling the fuel cap FC is removed from the filler neck 10 and fuel is dispensed into the filler neck 10 from the fuel gun, the fuel will be delivered to the fuel tank FT via the filler neck 10 and the inlet tube IT. The construction of each part of the filler neck 10 will be described in detail below.

(2) Construction of Filler Neck 10

Figure 2:
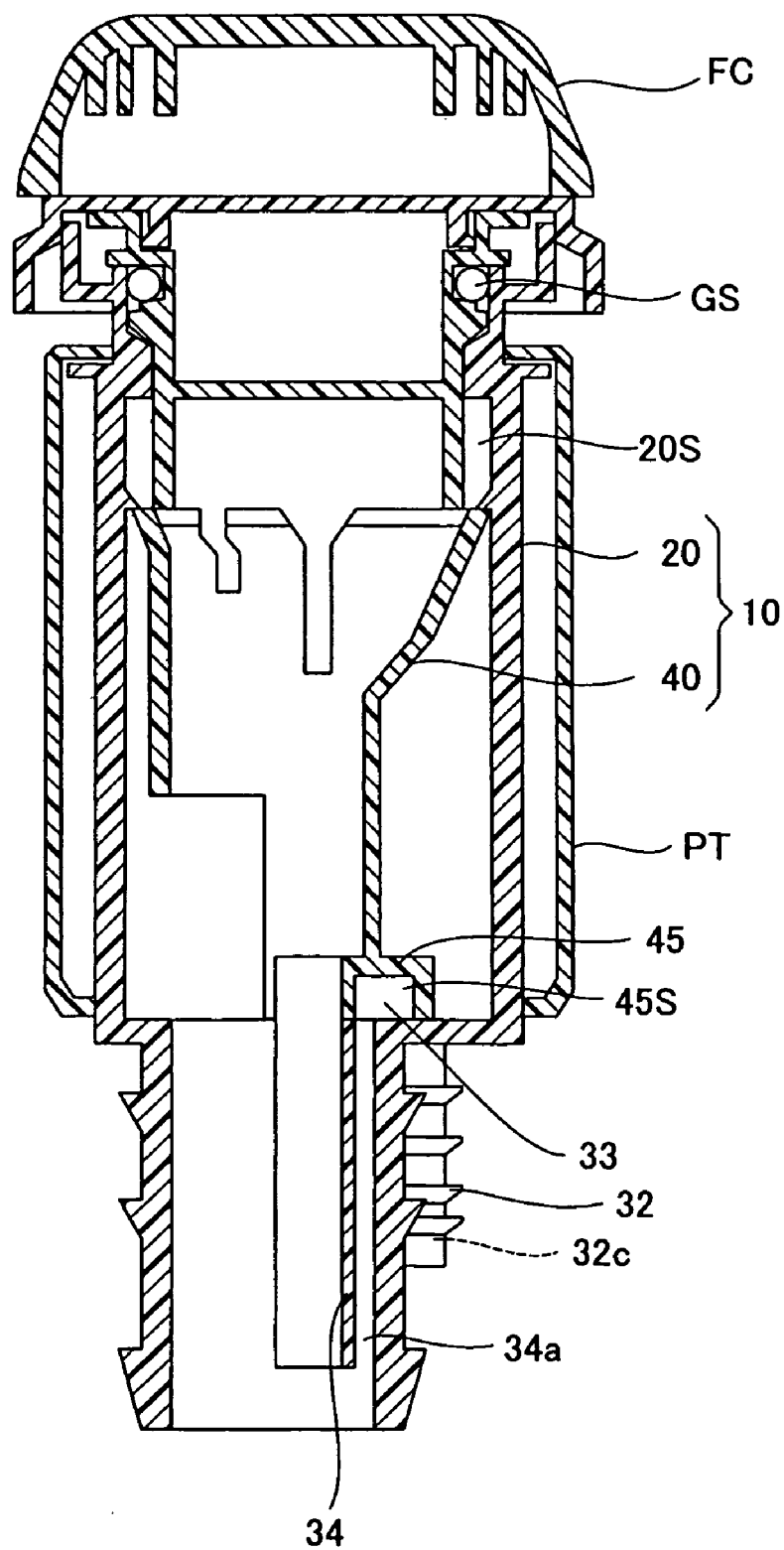
FIG. 2 is a sectional view depicting the vicinity of the filler neck.

FIG. 2 is a sectional view depicting the vicinity of the filler neck 10. The filler neck 10 accommodates the detachable fuel cap FC which opens and closes the inlet of the neck and which serves to connect to the fuel tank; it includes a neck tube body 20 having a housing chamber 20S, and a guide member 40 housed within the housing chamber 20S. A protector PT is installed on the outside peripheral part of the neck tube body 20.

Figure 3:
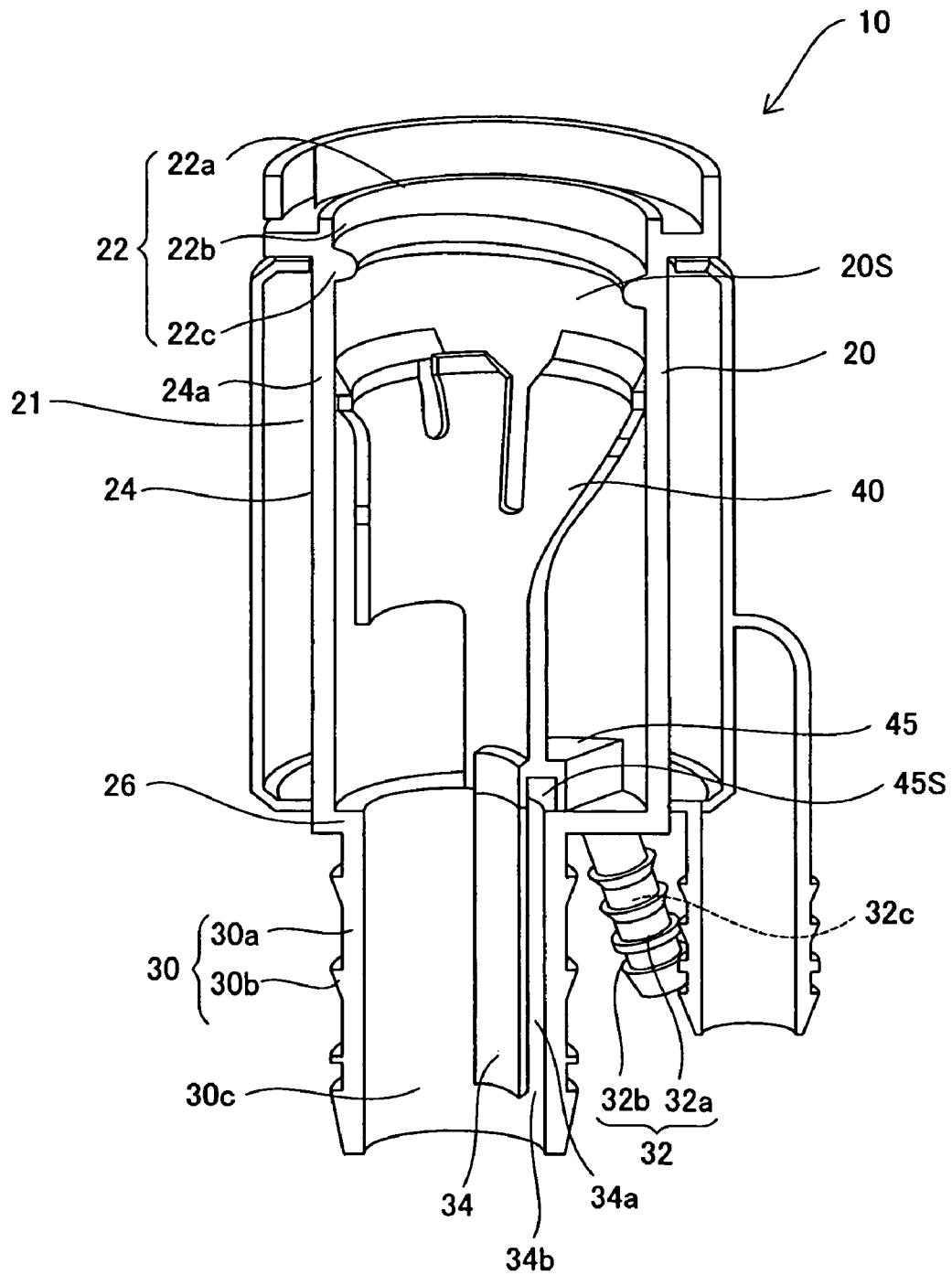
FIG. 3 is a perspective view depicting the filler neck in cross section.
Figure 4:
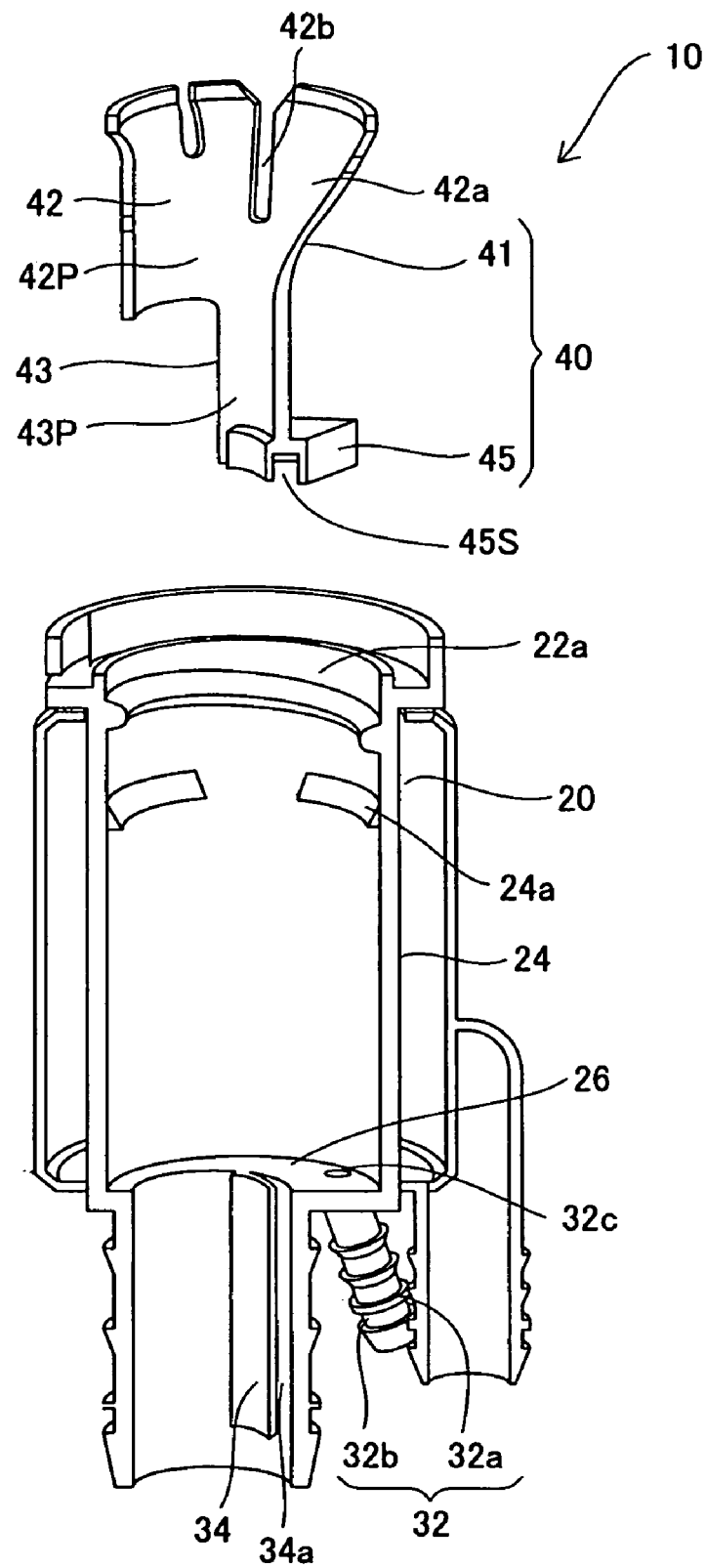
FIG. 4 is an exploded view of FIG. 3.

FIG. 3 is a perspective view depicting the filler neck 10 in cross section; and FIG. 4 is an exploded view of FIG. 3. The neck tube body 20 includes a main tube body 21 of cylindrical shape. The main tube body 21 includes an opening section 22, a side wall 24, and a base section 26, with the internal space defining the housing chamber 20S mentioned above. The opening section 22 has an upper opening 22a, a seal portion 22b, and a cap screw portion 22c, and is designed so that by inserting the fuel cap FC (FIG. 2) through the opening 22a and screwing it into the cap screw portion 22c, the seal portion 22b will be closed off in a sealed state by a gasket GS provided to the fuel cap FC. The side wall 24 is of substantially round cylindrical shape and includes on its inside peripheral section a catch claw 24a that detains the guide member 40 by engaging it. The base section 26 is integrally formed with the lower part of the side wall 24. The base section 26 has a primary connector section 30 and a secondary connector section 32 extending downward in parallel.

Figure 1:
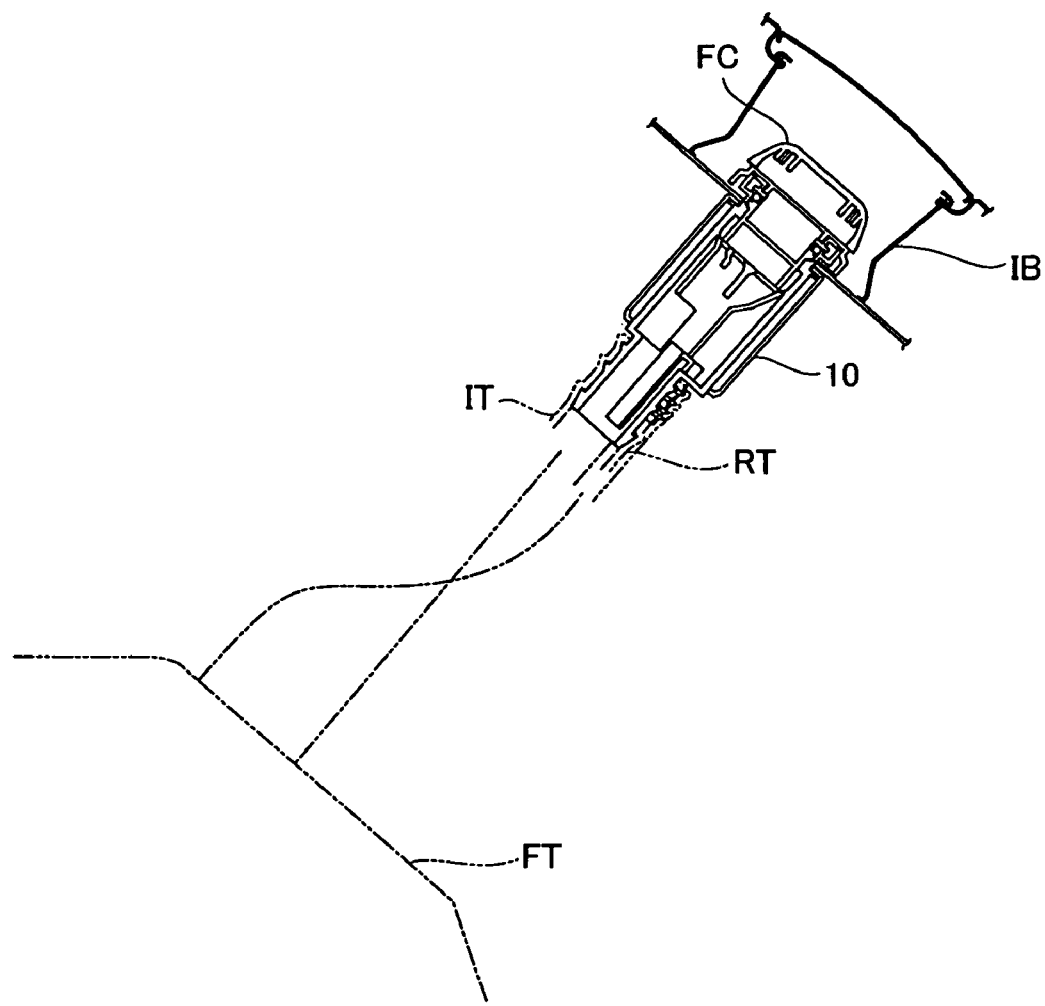
FIG. 1 is a general schematic diagram depicting a fueling device that employs a filler neck according to one embodiment of the present invention.

The primary connector section 30 includes on the outside peripheral section of a round cylindrical main connector body 30a a barbed portion 30b, and is connected to the fuel tank via a fuel passage 30c and the inlet tube IT (FIG. 1) by force fitting it into the inlet tube IT (FIG. 1). The secondary connector section 32 includes on the outside peripheral section of a round cylindrical main connector body 32a a barbed portion 32b, and is connected to the fuel tank via a vent passage 32c and the recirculation tube RT by force fitting it into the recirculation tube RT (FIG. 1). A passage-defining wall 34 for defining an outlet passage 34a is formed on the inside wall of the primary connector section 30. The lower part of the outlet passage 34a constitutes an outlet 34b that opens into the fuel passage 30c.

As depicted in FIG. 4, the guide member 40 is adapted to guide the fuel gun; it includes a guide portion 41 and a passage-defining section 45 that is integrally formed with the lower part of the guide portion 41. The guide portion 41 includes an upper guide portion 42 that flares out towards the top, and a substantially round cylindrical lower guide portion 43 formed below the upper guide portion 42. The upper guide portion 42 includes a sloping face 42a of decreasing diameter towards the lower guide portion 43 and in which are formed a plurality of slits 42b extending down from the upper edge. The inside space of the upper guide portion 42 constitutes an upper guide passage 42P for guiding the fuel gun. The inside space of the lower guide portion 43 constitutes a lower guide passage 43P that connects with the upper guide passage 42P.

The passage-defining section 45 has an inverted cup shape, and by being positioned resting on the upper face of the base section 26 defines a communicating chamber 45S that connects the vent passage 32c of the secondary connector section 32 with the outlet passage 34a of the passage-defining wall 34.

(3) Filler Neck 10 Assembly Operation

Next, the filler neck 10 assembly operation will be described. As depicted in FIG. 4, when the guide member 40 is slipped through the opening 22a of the filler neck 10, the lower guide portion 43 is supported with its lower end abutting the base section 26, while the upper end of the upper guide portion 42 of the guide member 40 rides over the catch claw 24a of the neck tube body 20 and becomes engaged thereby. The guide member 40 is thereby held within the neck tube body 20 as depicted in FIG. 3. At this point, the passage-defining section 45 of the guide member 40 covers the top of the vent passage 32c and of the outlet passage 34a, thereby connecting them via the communicating chamber 45S to form the recirculation passage.

(4) Fueling Operation

Figure 5:
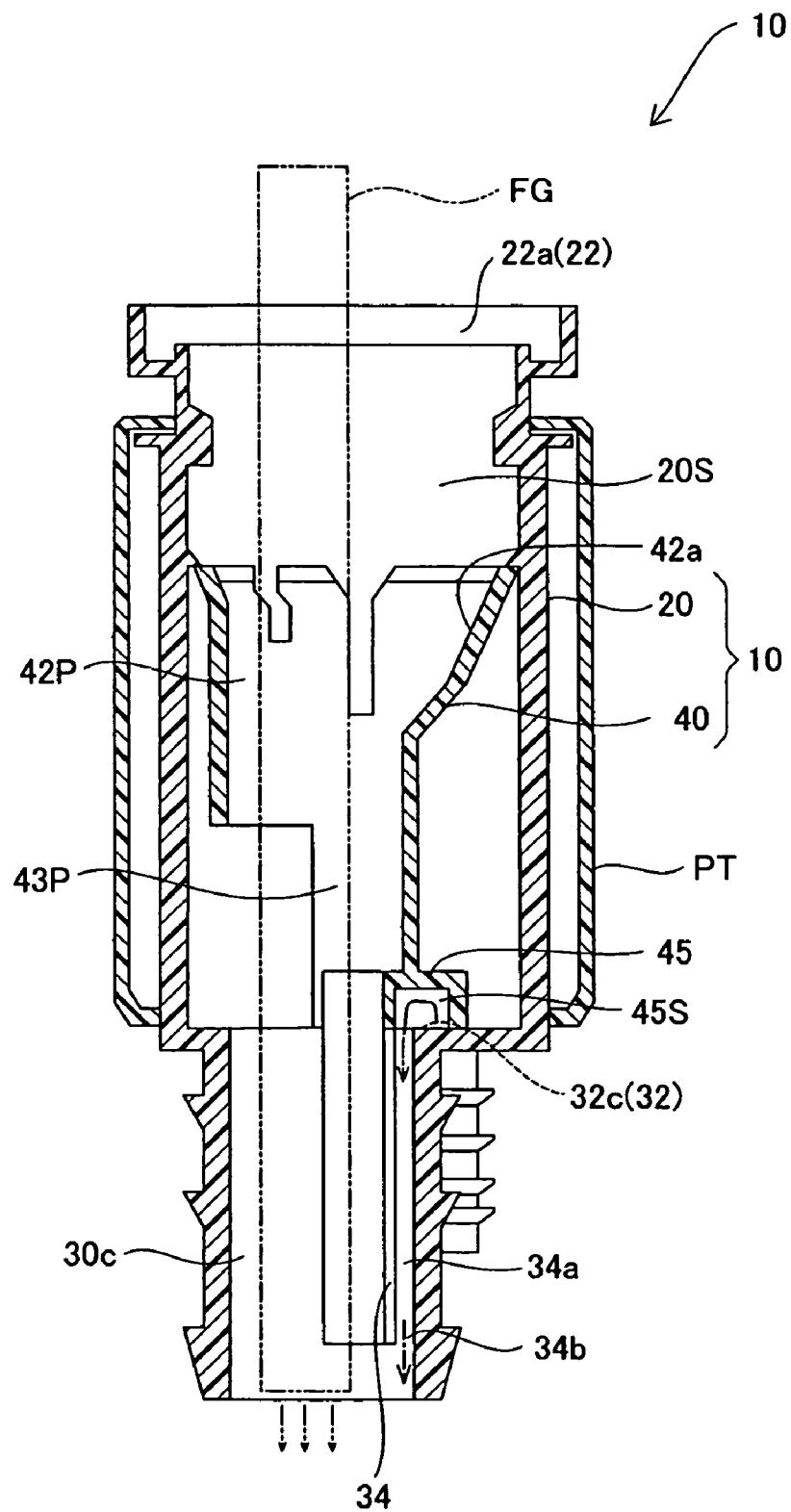
FIG. 5 shows a fueling operation.

As depicted in FIG. 5, fueling is carried out by detaching the fuel cap FC (FIG. 1) from the opening section 22 of the filler neck 10, and inserting the fuel gun FG through the opening 22a. The fuel gun FG, guided by the sloping face 42a of the guide member 40, is passed through from the upper guide passage 42P to the lower guide passage 43P and inserted into the fuel passage 30c. When fuel is then dispensed from the fuel gun FG, the fuel will flow into the inlet tube IT so that the fuel is supplied to the fuel tank. At this time, negative pressure will arise in the vicinity of the outlet 34b of the outlet passage 34a due to the flow speed of fuel flowing through the fuel passage 30c. This negative pressure facilitates outflow from the outlet 34b of air containing fuel vapors of the fuel tank via the recirculation passage, i.e. via recirculation tube RT, the vent passage 32c, the communicating chamber 45S of the passage-defining section 45, and the outlet passage 34a. Thus, air containing fuel vapors from the fuel tank can be expelled through the recirculation passage, so that fueling can take place smoothly.

Also, during fueling, the air containing fuel vapors from the fuel tank that has flowed out through the recirculation passage will now flow into the fuel passage 30c and the inlet tube IT together with the flow of fuel during fueling, so that the vapors will not be released to the outside through the opening 22a.

(5) Effects and Advantages of the Filler Neck 10 in Fueling

The embodiment affords the following effects and advantages.

(5)-1 The housing chamber 20S of the neck tube body 20 is sealed off from the outside by the fuel cap FC. Since the guide member 40 is housed inside this housing chamber 20S, provision of the guide member 40 does not require means for sealing the space between the guide member and the neck tube body 20 from the outside as in the prior art described above, thus affording a simpler construction.

(5)-2 Since the communicating chamber 45S is formed simply by inserting the guide member 40 furnished with the passage-defining section 45 into the housing chamber 20S, and moreover since the connecting location thereof is situated within the housing chamber 20S, stringent sealing ability will not be needed in order to form the recirculation passage, and the construction can be simpler.

(5)-3 Once the guide member 40 has been inserted through the opening 22a of the neck tube body 20, the lower part of the guide member 40 will be supported on the base part 26, while the upper end of the upper guide portion 42 of the guide member 40 will be retained on the neck tube body 20 through engagement with the catch claw 24a of the neck tube body 20, and secured to the neck tube body 20 thereby.

(5)-4 Since the outlet 34b of the outlet passage 34a that defines part of the recirculation passage is provided to the fuel passage 30c, which gives rise to negative pressure by the flow of supplied fuel, the air containing fuel vapors can be recirculated efficiently.

(6) Alternative Embodiments

This invention is not limited to the embodiment set forth herein and may be embodied with various modifications without departing from the spirit and scope of the invention, such as the following for example.

Figure 6:
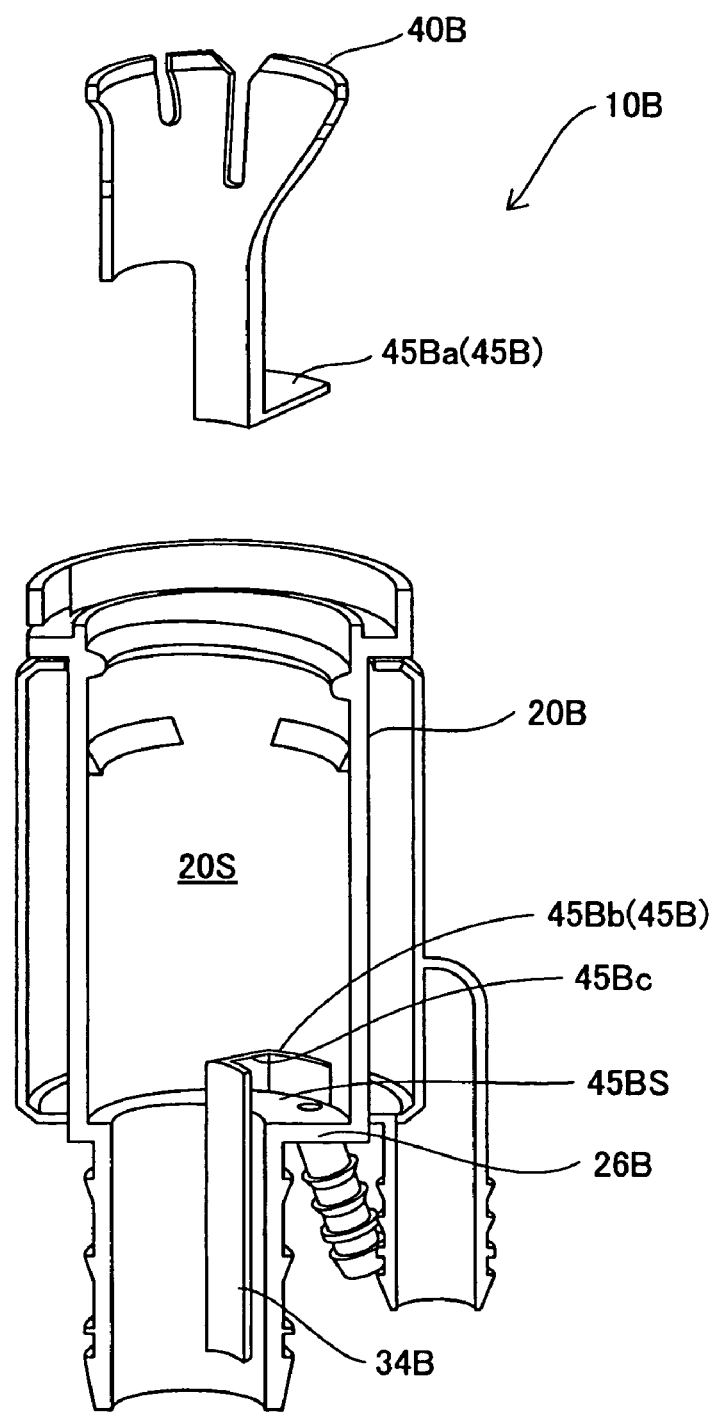
FIG. 6 is a perspective view depicting in exploded cross section a filler neck according to an alternative embodiment.

(6)-1 FIG. 6 is a perspective view depicting in exploded cross section a filler neck 10B according to an alternative embodiment. This embodiment features a different construction for the passage-defining section 45B. Specifically, the filler neck 10B includes a neck tube body 20B, and guide member 40B that is housed in the housing chamber 20S of this neck tube body 20B. A passage-defining section 45B that defines a communicating chamber 45BS is formed along the bottom part of the guide member 40B and the upper face of the base section 26B. The passage-defining section 45B includes sealing plate 45Ba of substantially arcuate shape formed at the bottom part of the guide member 40B, and an upright wall 45Bb rising up from the upper part of the base section 26B; the sealing plate 45Ba mates with an upper opening 45Bc at the upper part of the upright wall 45Bb to form the communicating chamber 45BS. The upright wall 45Bb is integrally formed with the upper part of a passage-defining wall 34B. In this embodiment, the passage-defining section 45B constitutes the communicating chamber 45BS through mating of the sealing plate 45Ba with the upper opening 45Bc; and also functions to position the guide member 40B.

Figure 7:
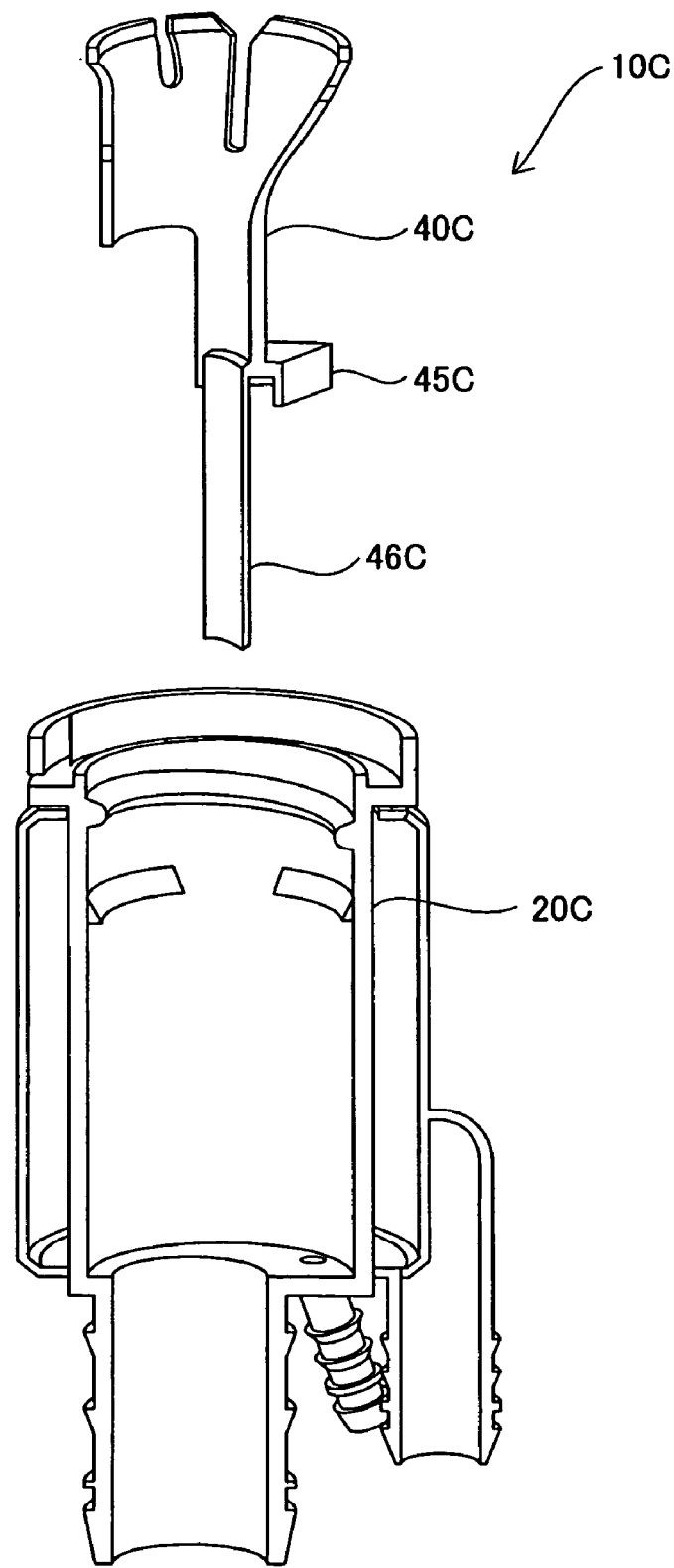
FIG. 7 is a perspective view depicting in exploded cross section a filler neck according to yet another alternative embodiment.

(6)-2 FIG. 7 is a perspective view depicting in exploded cross section a filler neck 10C according to yet another alternative embodiment. A passage-defining section 45C disposed in the lower part of a guide member 40C as taught in this embodiment may be integrally constituted with a passage-defining wall 46C for defining the outlet passage. The design of the mold of the neck tube body 20C can be simplified thereby.

(6)-3 Another acceptable construction is one having a simple seal member interposed between the outside peripheral edge of the passage-defining section and the zones bounding the vent passage and the outlet passage, to further enhance sealing ability through a simple construction.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A filler neck for guiding fuel dispensed from a fuel gun into a fuel tank, the filler neck comprising:

a neck tube body having a fuel passage; a guide member retained within the neck tube body for guiding the fuel gun; and a recirculation passage that connects the fuel tank with the neck tube body, the recirculation passage being configured to be separated from the fuel passage and directs fuel vapors inside the fuel tank into the fuel passage, wherein the fuel vapors mix with incoming liquid fuel, and the neck tube body includes (i) a housing chamber sealed off from the outside by a fuel cap; (ii) a primary connector section defining the fuel passage; and (iii) a secondary connector section connected to the housing chamber and defining part of the recirculation passage, and the guide member is a member housed in the housing chamber and includes (i) a guide section for guiding the fuel gun into the fuel passage; and (ii) a passage-defining section formed with the guide section and partly defining the recirculation passage inside the housing chamber, wherein the neck tube body includes a catch claw on an inside wall of the neck tube body, and the guide member is secured within the housing chamber through partial engagement of the guide member with the catch claw, the primary connector section includes a passage-defining wall that defines an outlet passage constituting part of the recirculation passage, the neck tube body includes a base section that is formed in a lower part of the primary connector section and that decreases in diameter from the primary connector section and connects with the secondary connector section, wherein the base section includes an upright wall that defines a communicating chamber connecting the recirculation passage with the outlet passage, and the passage-defining section includes a sealing plate that blocks off an upper opening of the communicating chamber, wherein the communicating chamber connects the recirculation passage with the outlet passage.

2. The filler neck in accordance with claim 1, wherein the passage-defining wall is integrally formed with the passage-defining section.

3. A filler neck for guiding fuel dispensed from a fuel gun into a fuel tank, the filler neck comprising:

a neck tube body having a fuel passage; a guide member retained within the neck tube body for guiding the fuel gun; and a recirculation passage that connects the fuel tank with the neck tube body, the recirculation passage being configured to be separated from the fuel passage and directs fuel vapors inside the fuel tank into the fuel passage, wherein the fuel vapors mix with incoming liquid fuel, and the neck tube body includes (i) a housing chamber sealed off from the outside by a fuel cap; (ii) a primary connector section defining the fuel passage; and (iii) a secondary connector section connected to the housing chamber and defining part of the recirculation passage, and the guide member is a member housed in the housing chamber and includes (i) a guide section for guiding the fuel gun into the fuel passage; and (ii) a passage-defining section formed with the guide section and partly defining the recirculation passage inside the housing chamber, wherein the primary connector section includes a passage-defining wall that defines an outlet passage constituting part of the recirculation passage, the neck tube body includes a base section that is formed in a lower part of the primary connector section and that decreases in diameter from the primary connector section and connects with the secondary connector section, wherein the base section includes an upright wall that defines a communicating chamber connecting the recirculation passage with the outlet passage, and the passage-defining section includes a sealing plate that blocks off an upper opening of the communicating chamber, wherein the communicating chamber connects the recirculation passage with the outlet passage.

4. A filler neck for guiding fuel dispensed from a fuel gun into a fuel tank, the filler neck comprising:

a neck tube body having a fuel passage; a guide member retained within the neck tube body for guiding the fuel gun; and a recirculation passage that connects the fuel tank with the neck tube body, the recirculation passage being configured to be separated from the fuel passage and directs fuel vapors inside the fuel tank into the fuel passage, wherein the fuel vapors mix with incoming liquid fuel, and the neck tube body includes (i) a housing chamber sealed off from the outside by a fuel cap; (ii) a primary connector section defining the fuel passage; and (iii) a secondary connector section connected to the housing chamber and defining part of the recirculation passage, and the guide member is a member housed in the housing chamber and includes (i) a guide section for guiding the fuel gun into the fuel passage; and (ii) a passage-defining section formed with the guide section and partly defining the recirculation passage inside the housing chamber, wherein the primary connector section includes a passage-defining wall that defines an outlet passage constituting part of the recirculation passage, the neck tube body includes a base section that is formed in a lower part of the primary connector section and that decreases in diameter from the primary connector section and connects with the secondary connector section, and the passage-defining section includes an inverted cup shape that is positioned resting on an upper face of the base section, wherein the passage-defining section is configured to define a communicating chamber that connects the recirculation passage with the outlet passage.

\* \* \* \* \*